United States Patent
Boos

(10) Patent No.: US 6,644,847 B2
(45) Date of Patent: Nov. 11, 2003

(54) QUASI-CONTINUOUS TREATMENT OF PARTICULATE MATERIALS WITH CLEANSING NOZZLE SYSTEM

(75) Inventor: Günther Boos, Bad Säckingen (DE)

(73) Assignee: Glatt Maschinen- und Apparatebau AG, Pratteln (CH)

( * ) Notice: Subject to any disclaimer, the term of this patent is extended or adjusted under 35 U.S.C. 154(b) by 0 days.

(21) Appl. No.: 09/860,599

(22) Filed: May 21, 2001

(65) Prior Publication Data
US 2001/0043848 A1 Nov. 22, 2001

(30) Foreign Application Priority Data
May 20, 2000 (CH) ..................... 2000 1010/00

(51) Int. Cl.⁷ ................................. B01F 15/02
(52) U.S. Cl. ................. 366/138; 366/169.2; 134/167 R
(58) Field of Search .................... 366/101, 106, 366/107, 138, 151.1, 169.1, 169.2, 170.4, 313, 141; 134/167 R, 168 R

(56) References Cited

U.S. PATENT DOCUMENTS

| | | | |
|---|---|---|---|
| 3,138,167 A | | 6/1964 | Fisher |
| 3,986,705 A | * | 10/1976 | Nauta |
| 4,527,902 A | * | 7/1985 | Christen |
| 4,646,768 A | * | 3/1987 | Tanaka et al. |
| 5,018,673 A | * | 5/1991 | Eirich et al. |
| 5,620,251 A | * | 4/1997 | Funder et al. |
| 5,766,281 A | * | 6/1998 | Luy et al. |
| 5,868,807 A | * | 2/1999 | Luy et al. |

FOREIGN PATENT DOCUMENTS

| | | | |
|---|---|---|---|
| CH | 686 343 | | 3/1996 |
| EP | 438772 | * | 7/1991 |
| EP | 0 781 585 | | 7/1997 |
| EP | 0 781 587 | | 7/1997 |
| EP | 0 781 949 | | 7/1997 |
| WO | 91/06365 | | 5/1991 |

* cited by examiner

Primary Examiner—Charles E. Cooley
(74) Attorney, Agent, or Firm—Jacobson Holman PLLC

(57) ABSTRACT

The multicell apparatus according to the invention is suitable for batchwise and in particular quasi-continuous operation, i.e. for the continuous processing of batches in rapid succession, for example for the preparation of readily free-flowing granules which are suitable for filling in capsules or sachets. The apparatus is in particular a multifunctional system which combines the process steps of batch introduction, metering, mixing/granulation, drying, product cooling and product collection with one another in a very compact design. The individual batches are conveyed inside the apparatus through a product path which is hermetically sealed from the outside and in which an internal pressure lower than the ambient pressure may additionally prevail at least in sections. This, together with the cleaning nozzles connected to a central cleaning system, permits contamination-free operation both with aqueous and with organic starting materials.

11 Claims, 5 Drawing Sheets

Interior

QUASI-CONTINUOUS TREATMENT OF PARTICULATE MATERIALS WITH CLEANSING NOZZLE SYSTEM

BACKGROUND OF THE INVENTION

1. Field of the Invention

The invention relates to an apparatus and a process for the quasi-continuous treatment of particulate materials.

2. Description of the Prior Art

Various apparatuses serving for the batchwise and/or quasi-continuous treatment of a particulate material are known, for example fluidized-bed apparatuses, as disclosed, for example, in CH-A 686 343, and mixing and stirring apparatuses, as disclosed, for example in WO-A 91/06365. Depending on the type of material to be treated and on the product to be produced therefrom, these known apparatuses can be used independently of one another or can be combined with one another in a so-called multicell apparatus.

In fluidized-bed apparatuses of the above-mentioned type, the particulate material is fluidized by means of gas, in particular air, and subjected to a treatment thereby. This may consist, for example, exclusively of drying of the material. Frequently, however, the material is first sprayed with a liquid in the fluidizing space and provided with a coating or granulated and then dried. In comparison, the mixing and stirring apparatuses according to WO-91/06365 are intended exclusively for granulation and/or mixing of a material with a fluid, for example water, an aqueous solution or an organic solvent.

Both apparatuses are used in combination with one another for the preparation of products for the formation of medicaments, foods, agrochemicals or seed pellets.

For the preparation of granules intended, for example, as a medicament or as a component of a medicament, for example at least one carrier substance, a binder and at least one pharmaceutical active substance can be mixed with one another in the dry state and the mixture is then moistened for granulation. The intermediate product thus prepared can then be further fed to a fluidized-bed apparatus of the above-mentioned type for further processing, for example drying.

If the purity of the particulate material to be processed in a multicell apparatus has to meet high requirements, it is often necessary, in particular when changing the materials processed, for the operator to clean the various systems of the apparatus, which is effected by opening the corresponding containers and cleaning the components removed. If toxic or otherwise health-hazardous materials were processed, opening of the various containers and removal of parts can cause contamination of the environment, contamination of the material and danger to the person or persons cleaning the container. In this context, it has been found, particularly in the case of pharmaceutical production plants that the opening of the various containers and the removal of parts for cleaning purposes can also cause undesired contamination of the plant with impurities from the environment, so that in this case additional measures have to be taken for cleaning the plant. It is true that EP-0 781 949 and U.S. Pat. No. 3,138,167 disclose fluidized-bed apparatuses or mixers which permit cleaning of the associated container with the aid of special cleaning nozzles without opening of said container. However, such cleaning means are not known for mixing and stirring apparatuses of the first-mentioned type.

Furthermore, in the preparation of a product, it is usual first to prepare, for test purposes, relatively small amounts of an end product, whose masses are, for example, of the order of a few kilograms. When the commercial utilization of the product begins, larger amounts of the product are to be prepared according to requirements. For the commercial production, larger apparatuses in which batches having masses of the order of 100 kg or more can be treated will then be used.

This procedure has the disadvantage that the preparation of a product requires several plants of different sizes, whose procurement and installation necessitate high capital costs. If the treatment of a material is carried out first in small apparatuses and then in larger apparatuses, it is necessary to determine new process parameters, in each case by further experiments, for the change of apparatus also frequently referred to as "scale-up", in order to be able to produce the product economically and reproducibly with the desired quality. These experiments are very time-consuming and also expensive. Moreover, the known apparatuses and plants are generally formed in such a way that manipulations to be performed by at least one person are required at least for introducing the material batch and removing the end product. These known apparatuses and plants therefore cannot be operated fully automatically and are not very suitable for continuous 24-hour operation. A further disadvantage is the narrow application range of the installed plants.

SUMMARY OF THE INVENTION

It is the object of the invention to eliminate disadvantages of the above-mentioned apparatuses and to propose a novel multicell apparatus which in turn can be cleaned and rendered absolutely hygienic without opening and dismantling of components of the apparatus, i.e. with little expenditure of labor and time. The apparatus should moreover be formed in such a way that it can be operated fully automatically.

This object is achieved, according to the invention, by a multicell apparatus for the batchwise, in particular quasi-continuous, treatment of a particulate material, comprising the following units:

- a first container for receiving the premixed material,
- a conveyor system connected to the outlet of the container and containing a metering device and a weigher device,
- a mixing and stirring means connected in the process direction to the conveyor system,
- a homogenizing device downstream of the mixing and stirring means,
- a fluidized-bed apparatus having at least two containers for drying and possibly granulation and/or coating of the material,
- a product separator connected to the outlet of the fluidized-bed apparatus and
- a second container for receiving the end product, wherein all units of the apparatus are water-tight, that a cleaning system which permits cleaning of the entire apparatus without opening of the various units of the apparatus is present, for which purpose in each case at least one cleaning nozzle connected to a central cleaning system is arranged

- in the feed pipe and discharge pipe of the mixing and stirring means,
- in the homogenizing device,
- in the containers of the fluidized-bed apparatus,
- in the product separator and in the end product container, and wherein these cleaning nozzles are formed in such a way that, during cleaning of the apparatus, they can be extended into the interior of the corresponding unit of the apparatus and, during treatment of the material, can be completely retracted into the wall bounding said interior.

The multicell apparatus according to the invention is suitable for batchwise and in particular quasi-continuous operation, i.e. for the continuous processing of batches following one another in rapid succession, for example for the preparation of readily flowable granules which are suitable for filling into capsules, sachets and/or for further processing to give tablet-like products for the pharmaceutical, fine chemical and food industries.

The apparatus according to the invention is a multifunctional system which combines the process steps of batch introduction, metering, mixing/granulation, drying (preliminary and subsequent drying) and product collection and possibly additionally the process steps of moist sieving (after mixing/granulation), coating, admixing of additives, dry sieving (after drying) and product cooling with one another in a very compact design. The individual batches are conveyed inside the apparatus through a product path which is hermetically sealed from the outside and in which an internal pressure lower than ambient pressure may additionally prevail, at least in sections. This, together with the cleaning means defined in more detail below, permits contamination-free operation both with aqueous and with organic formulations.

The apparatus is moreover designed for continuous use and meets the high hygiene requirements of the pharmaceutical industry with respect to the performance of the operations of metering, mixing, granulation and drying. The apparatus according to the invention is preferably completely automatically controlled.

The preparation of granules is effected as a rule using water but, with the use of a solvent recovery system providing adequate environmental protection, can also be carried out by means of organic solvents.

In quasi-continuous operation, the initially introduced total batch is divided in a batch container metering system into the individual subunits. The subunits may be 2–15 kg, depending on the size of the apparatus. A substantial advantage of the apparatus according to the invention is therefore the fact that the individual batches always remain constant in the case of apparatuses of the same size and that an increase in the production rate is also possible without problems using the same apparatus, in particular by increasing the number of batch throughputs per unit time. For the user, this means an important economic advantage since in this case it is possible to dispense with the expensive change of apparatus and the time-consuming scale-up experiments in standard operations of mixing, granulation and drying.

Below, the invention is described in more detail with reference to embodiments shown in the drawings.

DESCRIPTION OF PREFERRED EMBODIMENTS

Figure 1:
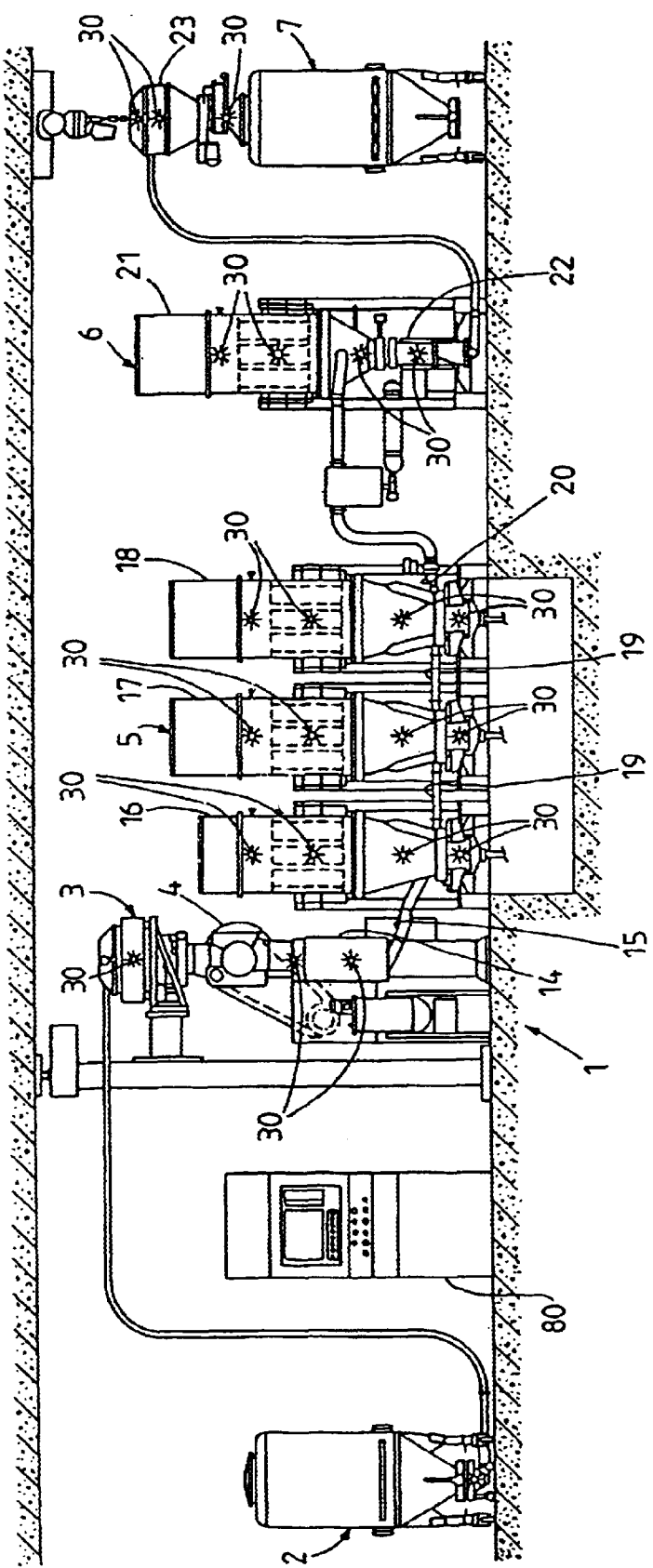
FIG. 1 shows a schematic diagram of an apparatus according to the invention, comprising a granulating unit and a fluidized-bed device of the type stated at the outset.

The apparatus shown in FIG. 1 is intended for the production of tablets, sachets and capsules and has, in the sequence of the material treatment, the following substantial production units:

a container 2 for receiving the premixed crude product, a conveyor system 3 comprising a metering apparatus and a weigher apparatus, a mixer 4, also referred to as a granulating unit, for granulating the particulate material, a fluidized-bed means 5 for any further granulation, drying and coating of the material, a product separator 6 and an end product container 7 for receiving the product and preparing it for further processing, for example tabletting.

The above-mentioned production units are substantially a part of the general prior art and are disclosed in part in their design and function in CH-A 686 343, WO 91/06365 and EP-0 781 949. Where the individual components are not described in detail below, they correspond to the apparatuses disclosed in these publications. These publications are therefore hereby expressly incorporated by reference.

The apparatus 1 according to the invention furthermore has a control unit 80 shown schematically in FIG. 1. This includes a control circuit having electrical and/or electronic components for measurement, control and regulation. The control unit 80 is formed in particular in such a way that the production and cleaning processes explained in more detail below can be carried out and controlled fully automatically or at least semiautomatically.

Figure 2:
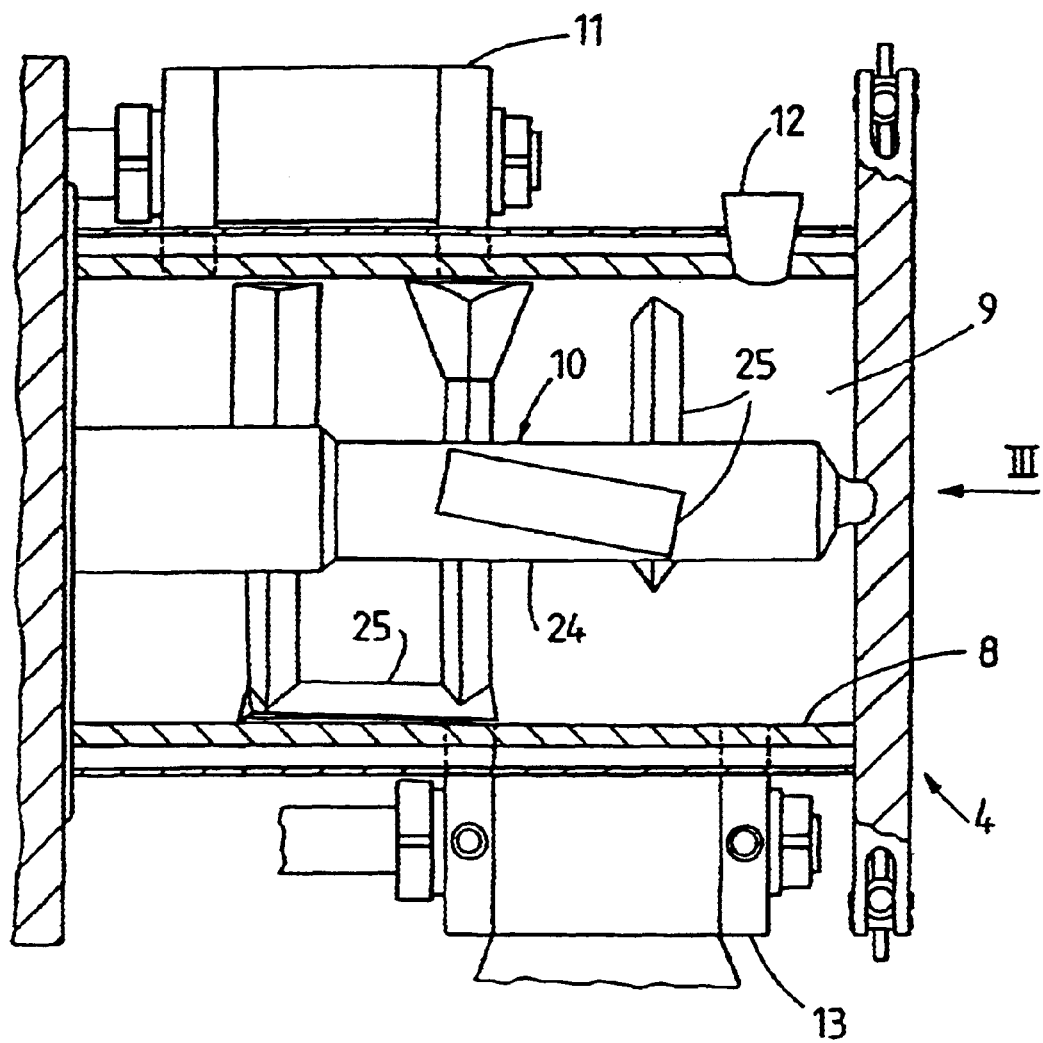
FIG. 2 shows a first embodiment of a granulating unit in a simplified and schematic axial section.
Figure 3:
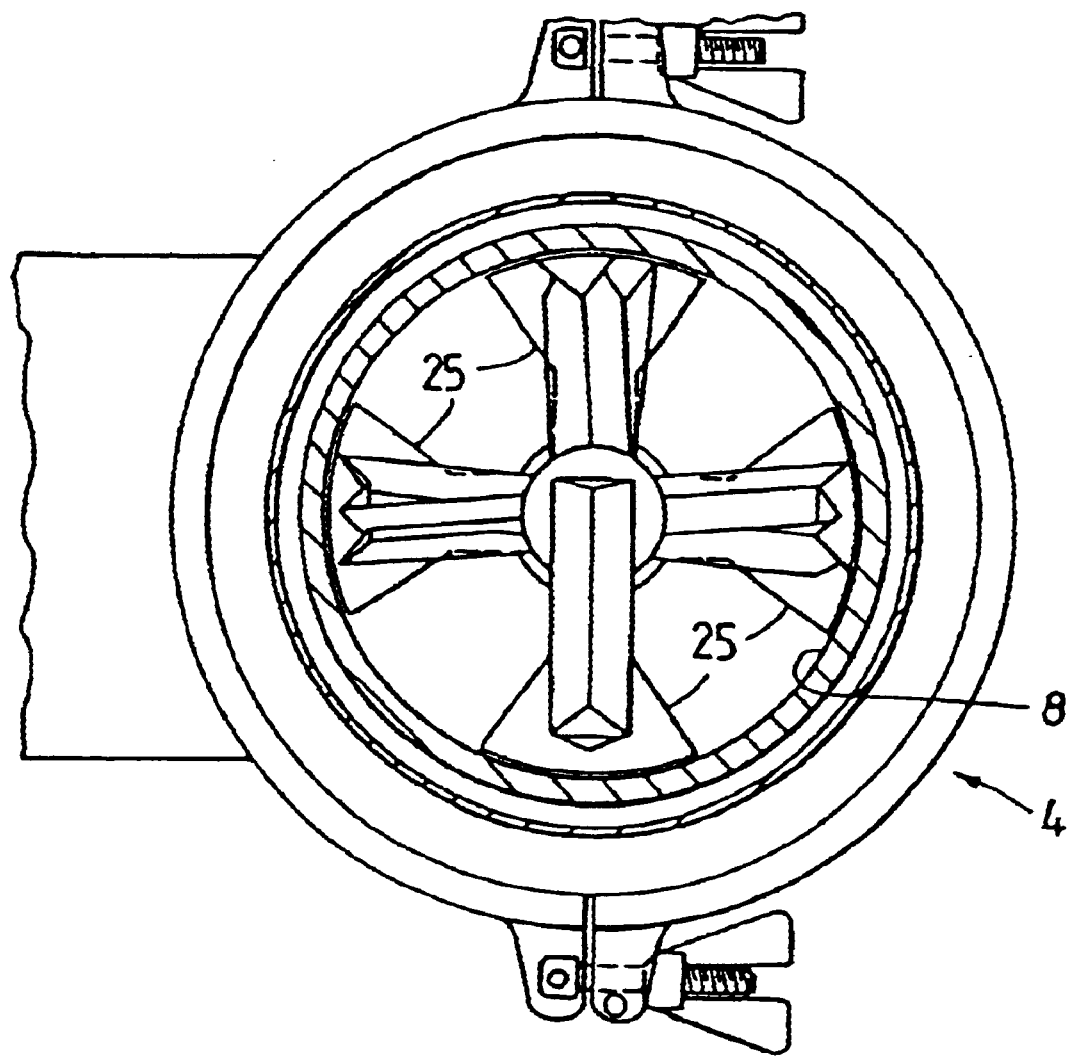
FIG. 3 shows a schematic plan view of the chamber and the rotor of the granulating unit in the direction of view indicated by the arrow III in FIG. 2.

The granulating unit 4 shown in detail in FIGS. 2 and 3 has a chamber 8 with a preferably double-walled cylindrical jacket and a rotor 10 arranged in the interior 9. A material inlet 11 and a liquid inlet 12 lead into the chamber 8. Such liquid inlet is equipped, for example, with a one-material nozzle for spraying a liquid. Furthermore, the chamber 8 is provided with a material outlet 13. The inlets 11 and 12 and the outlet 13 are moreover equipped with closure flaps, as are familiar from granulating units already known.

The material outlet 13 is connected to a homogenizing apparatus 14. This has a housing, a sieve and a rotor and makes it possible to break up any lumps in the material. The outlet of the homogenizing apparatus 14 is connected by means of a pipe 15 which runs downwards and is inclined at least for the greatest part to the fluidized-bed apparatus 5 denoted as a whole by 5 and serving substantially for the quasi-continuous drying of the material. The homogenizing apparatus 14 furthermore has an air inlet which is provided with a filter and through which ambient air can be sucked into the interior of the homogenizing apparatus 14 and can be filtered. Apart from this air inlet, the interiors of the material outlet 13, or of the homogenizing apparatus 14 and of the pipe 15 are sealed gas-tight from the environment.

The fluidized-bed apparatus 5 has at least two, preferably at least three, fluidized-bed containers 16, 17 or 18 arranged side by side and small distances apart. Said containers are referred to below, in the order of the reference numerals, as first, second and third fluidized-bed containers. Moreover, the containers are formed and are connected to one another as described in CH-A 686 343. Thus, the containers 16, 17 and 18 are connected to one another by passages 19, and the last container 18 has a material outlet 20 which is connected by means of a pipe to the product separator 6. In the connecting pipe between the last drying stage and the product separator 6, it is additionally possible to mount a metering hopper which makes it possible to add small amounts of additives to the dried granules.

Each container 16, 17 and 18 has a separate inlet air and exhaust air system so that the process air for each individual container can be automatically controlled, i.e. conditioned with respect to humidity and temperature and optimized in terms of energy. Consequently, individual drying stages can be optimally managed and can be adapted to the specific product characteristics.

In addition, sampling devices which can be manually operated and/or automatically controlled and which make it possible to take samples of the throughput product during the process can be provided on each fluidized-bed container 16, 17, 18. Any additionally present inlet also permits the metering of at least one additional, pulverulent component for the material being treated in the fluidized-bed apparatus. Each container may also be equipped with a separate temperature and air flow regulating means. This makes it possible to tailor the process optimally to the product used and its properties.

The product separator 6 has, for example, a cyclone filter separator 21 or a filter system as used in fluidized-bed containers, and a high speed sieve device 22 for sieving dry product. Finally, the end product container 7 is connected to the product separator 6, a vacuum-suction conveyor system 23 additionally being installed upstream of said end product container in the direction of flow. Both the connecting pipe between fluidized-bed apparatus 5 and product separator 6 and the connecting pipe between product separator 6 and end product container 7 are sealed gas-tight from the environment for the purposes of the invention.

The granulating unit 4 shown on a larger scale in FIGS. 2 and 3 has a drive device which is not defined in more detail and which has an electric motor and a gear. The motor is formed in such a way that the direction of rotation of its shaft is electrically controllable, i.e. reversible. Driving is preferably performed via a step-down synchronous belt gear whose speed is continuously adjustable by means of a frequency converter.

The rotor 10 has a number of stirring members 25 distributed around its shaft 24 and along said shaft. These stirring members all serve for moving and stirring material but are differently formed, and depending on their additional functions provided for stirring, can therefore be divided into conveyor stirring members, dispersers and/or shredders and scraping-stirring members. The stirring members 25 project away from the axis and the shaft 24 at least approximately up to the inner surface of the jacket, narrow gaps of, preferably, a few tenths of a millimeter forming between said inner surface and those edges of the stirring members which are furthest away from the axis.

The mixer 4 which can preferably be used for the preparation of wet granules has a capacity of 4 to 30 l and, depending on the product to be prepared, permits the treatment of over 500 batches of 9 to 15 kg consecutively without intermediate cleaning. As already mentioned above, the cylindrical jacket 8 is double-walled. The housing wall of the mixer 4 can thus be cooled by passing a cooling fluid through the double-walled jacket 8, and the internal temperature can thus be kept low during the granulation. As a result of the low internal temperature, humid conditions then always prevail, with the result that adhesion of the granules to the inner surface of the jacket is avoided.

The apparatus 1 has, as a substantial component, a cleaning system which is characterized in that special cleaning nozzles which permit cleaning of the apparatus without opening of the various units of the apparatus and in particular fully automatically and without any manual intervention by a person are arranged at various positions along the product path, so that a very fast product change can be carried out by means of this apparatus. Suitable cleaning nozzles intended for this purpose are in particular cleaning nozzles from Glatt GmbH, DE-Binzen, which are described in detail in EP-A-0 781 585 (corresponding to U.S. Pat. No. 5,868,807) and EP-A-0 781 587 (corresponding to U.S. Pat. No. 5,766,281). Regarding the construction and function of the cleaning nozzles which may be used according to the invention, these publications are also hereby expressly incorporated by reference.

The apparatus 1 is furthermore constructed to be watertight. The individual parts can, if required, can therefore be flooded for the cleaning process. Consequently, the duration of cleaning can be reduced from more than one working day—as is the case, for example, with conventional fluidized-bed apparatuses—to a few hours.

According to the invention, the cleaning nozzles are arranged in the positions denoted by 30 in FIG. 1, for example in the feed line and discharge line of the mixer 4, in the homogenizing apparatus 14, in the containers of the fluidized-bed apparatus 5, in the product separator 6, and there in particular in the cyclone filter separator 21 and in the high-speed sieve device 22 and finally also in the end product container 7, and there preferably in the feed region.

In the embodiment shown, further cleaning nozzles are additionally arranged in the conveyor system 3 and in the vacuum-suction conveyor system 23.

The cleaning nozzles are formed in these preferred positions so that, during use, they are extended into the interior of the corresponding container or pipe section. When not in use, they are then completely retracted into the wall bounding the container or the pipe section, so that, during operation of the apparatus 1, no edges and corners are present which permit undesired deposits of material particles or hinder the product flow.

As already mentioned, it is the object of the invention to propose a multicell apparatus which can be cleaned fully automatically, i.e. without any manipulation, so that no contamination of the product path is to be feared, especially during a product change. For this purpose, the apparatuses upstream and downstream of the granulating unit 4 can be equipped with the cleaning nozzles of the above-mentioned type, according to the prior art, without considerable effort. The same applies to the connections 11, 12 and 13 of the granulating unit 4, which optionally can be shut off and opened.

Regarding the fully automatic cleaning of the granulating unit 4 itself, however, the latter comprises some substantial structural modifications compared with known granulating and mixing apparatuses.

A substantial problem in this case is the cleaning of the interior since, in order to achieve as little deposition as possible on the inner surface of the jacket, all mixing tools are arranged here in such a way that the entire inner cylinders are scraped, both along the circumference and along the end face, completely by the mixing tools at a distance of a few tenths of a millimeter. Cleaning of the interior of the container by means of cleaning nozzles of the above-mentioned type is thus not possible here. It is therefore proposed to mount a plurality of flat-jet nozzles permanently on the mixer shaft, which nozzles revolve with said shaft and can reach the inner surface of the jacket with a direct water jet during the rotation of the mixing tools.

Figure 4:
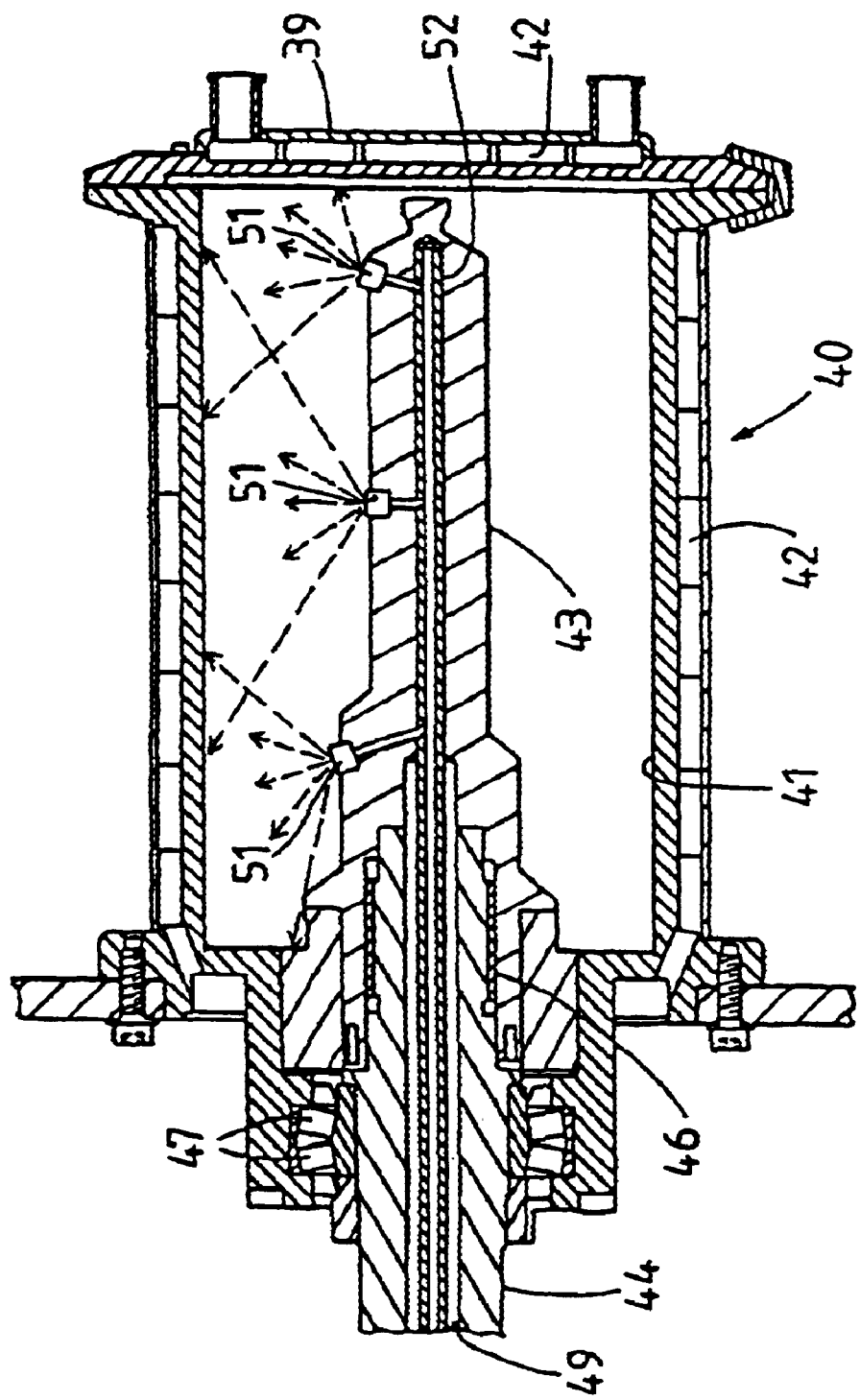
FIG. 4 shows a second embodiment of a granulating unit in a likewise simplified and schematic axial section and FIG. 5 shows a schematic plan view of the drive part of the rotor belonging to the granulating unit of FIG. 4.
Figure 5:
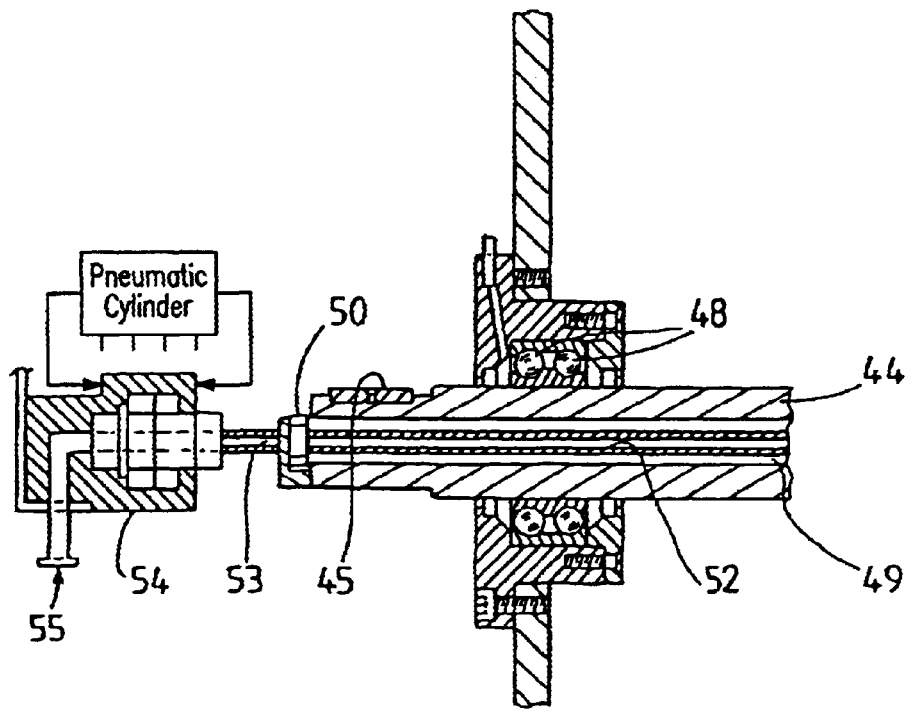
Figure 6:
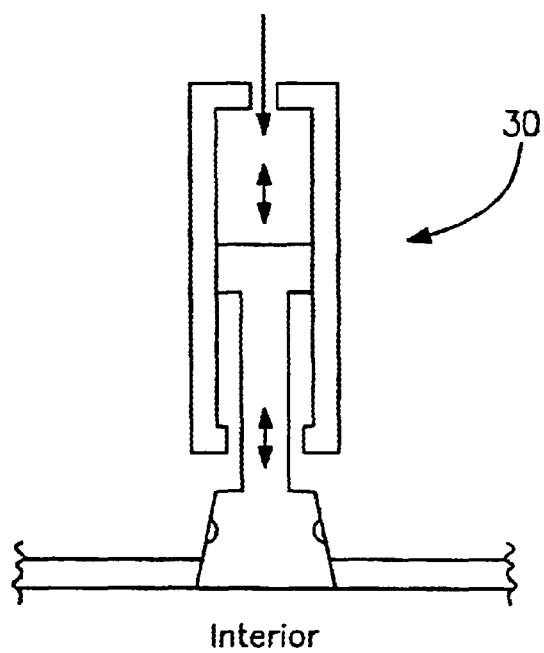
FIG. 6 is a schematic of a retractable cleansing nozzle.

A granulating unit having such a mixer shaft is shown in FIGS. 4 and 5 and is denoted as a whole by 40. It has a cylindrical chamber with a double-walled jacket 41 and a front wall 39 which is likewise double-walled, so that a cooling fluid can be passed into the spaces 42 for cooling the interior of the chamber in a known manner.

The shaft 43 shown without mixing tools is mounted on the drive shaft 44 and is driven by said drive shaft. The force is transmitted here by a synchronous belt drive 45 arranged at the free end of the drive shaft 44 and by a multiple tooth system 46. The shaft 44 is supported by the ball bearings 47 and 48. The frictional axial connection and hence the axial position of the shaft 43 are provided by a tension rod 49 and a nut 50. The mixer shaft 43 is thus mounted in an overhanging manner and the shaft leadthrough is sealed by a gas-flushed or liquid-flushed, double-acting face seal which is not defined in more detail.

According to the invention, the cleaning of the interior of the mixer is effected by means of flat-jet nozzles 51 which are mounted on the mixer shaft 43. The nozzles 51 are connected by means of passages to a control lance 52 which in turn has an axial passage 53 and, for operation of the nozzles 51, is connected to a liquid dispenser 54, also referred to as a rotary distributor, in the drive region of the mixer 40. The latter is thus connected on one side to the cleaning apparatus, which is not shown and which provides the wash medium, and rests on the other side on the control lance 52 which extends coaxially through the tension rod 49 and into the mixer shaft 43.

Mixer shaft 43 and control lance 52 are not connected to one another but, during operation of the mixer 40, have the same speed owing to a driver unit which is not shown.

The nozzles 51 have an outlet angle of about 120° and can thus directly reach almost the entire inner surface of the chamber. In the front view, these nozzles may be present appropriately distributed over the circumference of the mixer shaft 43. The individual nozzles 51 are, for example, arranged uniformly over a circumference of 360°, in particular in such a way that the jet cones of the various nozzles 51 overlap. The position and the number of cleaning nozzles 51 can be varied and optimized according to the size of the mixer 40. From 4 to 7 nozzles 51 are preferably installed. The cleaning sequence takes place in the usual manner, by means of prepared cleaning water with a wash medium.

Since the product is forced outwards, i.e. away from the nozzles 51, by the centrifugal force during the operation of the mixer 4, pressing of the product into the nozzles 51, as would be the case, for example, with nozzles passing close to the wall of the cylinder jacket, is avoided.

The flat-jet nozzles 51 are preferably fastened to the mixer shaft 43 by so-called "cold expansion" (cooling of the nozzles in liquid nitrogen before they are introduced into exactly fitting holes), so that consequently the nozzles can be fastened without welding on, and replacement of the nozzles is in turn possible, with their destruction but once again without welding.

If all nozzles are connected via the rotary distributor to a common pipe, one or more nozzles may become blocked and consequently the cleaning liquid may emerge only through one nozzle. The result would be contamination. In order to prevent this, the nozzles are preferably individually actuated. For this purpose, the control lance can be axially displaced by means of a pneumatic cylinder which can approach a number of different positions corresponding to the nozzles present on the shaft. In this case, the control lance has orifices, one of which in each case can be made to correspond to the inlet channel of a flat-jet nozzle by means a specific position of the pneumatic cylinder. This means that only one nozzle can be fed with cleaning liquid in each position of the cylinder. The various lance orifices are sealed from the shaft and from the tension rod by, for example, O-rings.

The operation of the apparatus shown in FIG. 1 is explained in more detail below, here too, while the individual process steps are not described in detail, reference being made to the above-mentioned publications.

The operation of the apparatus according to the invention is divided into the following process sections:

1. Emptying of the Container 2 and Metering of the Material to be Treated in Individual Batches:

The container 2 containing premixed crude product is retracted into the process region of the apparatus and positioned at a container emptying station. An emptying hopper is then pressed against the connection flange of the container with the aid of pneumatic cylinders. The connection is then sealed by pressing on and deforming an associated flap seal.

In a next step, the product is transported into a buffer container with the aid of conveyor system 3, metered and weighed in. The weighed batches then enter the granulating unit 4 under the force of gravity.

2. Preparation of Granules:

For the wet granulation, the spray medium is sprayed into the mixer by means of a high-pressure airless pump. By periodic reverse operation of the mixer shaft, the product is moved axially back and forth between the end faces and is furthermore centrifugally accelerated outwards. Forced kneading of the granules is thus achieved, and hence highly compacted granules.

The granulation can be carried out in two different ways:
Binder is sprayed in with the spray solution and is bound with premix.
Binder is present in dry form in the premix and is dissolved with the aid of the spray solution and binds the premix to give the desired granules.

After the granulation process, the mixer is emptied with optimum direction of rotation and frequency of rotation of the mixing shaft. The wet granules are then transported through the downstream moist sieving device with the aid of reduced pressure and fed to a first dryer stage.

3. Fluidized-bed Drying and Fluidized-bed Coating:

The preliminary and main drying of the wet granules are effected in a plurality of drying containers. If required, the fluidized-bed drying container or the fluidized-bed coating container can be combined with a solvent recovery system.

In a preferred embodiment of the invention, the fluidized-bed apparatus 5 consists of three independent but identical dryer containers. The first container is used for preliminary drying with, if desired, high temperatures, the second one is used for the main drying and the third one for subsequent drying or cooling.

With the use of an additional coating stage and/or granulating stage, the third container 18 is connected as a dryer after the coating or granulating stage and performs the subsequent drying of the coated or granulated material. In this case, coating stage and granulating stage are also in the form of fluidized-bed containers and additionally have a spray means for the coating or granulation.

The product passes through each fluidized-bed container in the horizontal direction. The residence time per container varies according to the product characteristics and may be up to 5 minutes. As soon as a drying step is complete, the batch is transported further with the aid of the reduced pressure generated by the next stage, after which the emptied stage is immediately loaded again with a subsequent product batch.

4. Product Cooling and Separation:

After the drying process, the product is transported into the product separator 6. The transport is effected according to the same principle as the transport between the individual fluidized-bed containers. The dry granules then enter the container 7.

5. Cleaning Process:

The cleaning of all units of the apparatus and of their connections is effected by the cleaning system according to the invention. For this purpose, all cleaning nozzles denoted by 30 are connected to a central cleaning unit, as are the cleaning nozzles 51 of the granulating unit 40. In the central cleaning unit, the cleaning water is prepared appropriately with cleaning agent and is fed to the various nozzles by means of a high-pressure delivery pump. Here, the time, the duration of cleaning and also specific cleaning parameters, such as amount of cleaning agents to be used and the like, can either be determined manually by a person or be specified automatically by the central control system 80. After each cleaning operation has been carried out, the various cleaning nozzles—and in the case of the mixer 40 also the lance 52—are blown out with compressed air and then dried.

What is claimed is:

1. Apparatus for the batchwise, quasi-continuous, treatment of a particulate material, comprising the following units:

a first container for receiving premixed material and having an outlet, a conveyor system connected to said outlet of the container and containing a metering device and a weigher device, a mixing and stirring means comprising a feed pipe and a discharge pipe, which means are connected in a process direction to the conveyor system, a homogenizing device downstream of the mixing and stirring means, a fluidized-bed apparatus having at least two containers for at least one of drying, granulation and coating of the material, said fluidized-bed apparatus having an outlet, a product separator connected to said outlet of the fluidized-bed apparatus and a second container for receiving the end product, wherein all said units are water-tight and comprise a wall bounding the corresponding interior, wherein a cleaning system which permits cleaning of the entire apparatus without opening of any of said units of the apparatus is present, for which purpose in the feed pipe and discharge pipe of the mixing and stirring means, in the homogenizing device, in the containers of the fluidized-bed apparatus, in the product separator and in the end product container, at least one cleaning nozzle connected to a central cleaning system is arranged and wherein these cleaning nozzles are formed in such a way that during cleaning of the apparatus, they can be extended into the interior of the corresponding unit of the apparatus and, during treatment of the material, can be completely retracted into the wall bounding said interior.

2. Apparatus according to claim 1, wherein the mixing and stirring means is a granulating unit.

3. A granulating unit for an apparatus according to claim 2, comprising a chamber with a double-walled jacket, a material inlet opening into the interior of the chamber, a material outlet, a rotor rotatable about a substantially horizontal axis and having a shaft and stirring members distributed along said shaft, and drive means for rotating the rotor, wherein the drive means are formed for alternately changing the direction of rotation of said shaft, that those edges of the stirring members which are furthest away from the axis extend up to the inner surface of the jacket, except for a narrow gap of a few tenths of a millimeter, and wherein a plurality of flat-jet nozzles are arranged on the shaft and are connected by means of at least one inlet passage to a control lance, which in turn has an axial passage, extends coaxially through the shaft and is connected to a liquid dispenser.

4. Granulating unit according to claim 3, wherein the shaft is mounted on a drive shaft and is supported on said drive shaft in an overhanging manner.

5. Granulating unit according to claim 3, wherein the flat-jet nozzles have an outlet angle of 120°.

6. Granulating unit according to claim 3, wherein the flat-jet nozzles are distributed over the circumference of the shaft.

7. Granulating unit according to claim 3, wherein the control lance can be axially displaced by means of a pneumatic cylinder which can approach a number of different positions corresponding to said flat-jet nozzles present on the shaft, and wherein the control lance has orifices, each of which can be made to coincide with the inlet passage of a respective flat-jet nozzle by means of a specific position of the pneumatic cylinder.

8. Apparatus according to claim 1, comprising a central control system for automatic control of the cleaning system, so that the cleaning can be carried out without any manual intervention by a person.

9. Fluidized-bed apparatus for an apparatus according to claim 1, wherein said at least two fluidized-bed containers are arranged side by side.

10. Fluidized-bed apparatus according to claim 9, wherein said at least two fliuidized-bed containers include three fluidized-bed containers arranged side by side.

11. Process for the batchwise, quasi-continuous treatment of particulate material, using the apparatus according to claim 1, comprising the successive process steps of batch introduction in the first container, metering in the metering device, granulation by the mixing and stirring means, drying and product collection by the fluidized-bed apparatus and second container, respectively, and cleaning each of the units without opening the various units of the apparatus.

* * * * *